May 26, 1931.  P. J. McCULLOUGH  1,806,635
BRAKE BEAM SAFETY DEVICE
Filed May 2, 1929
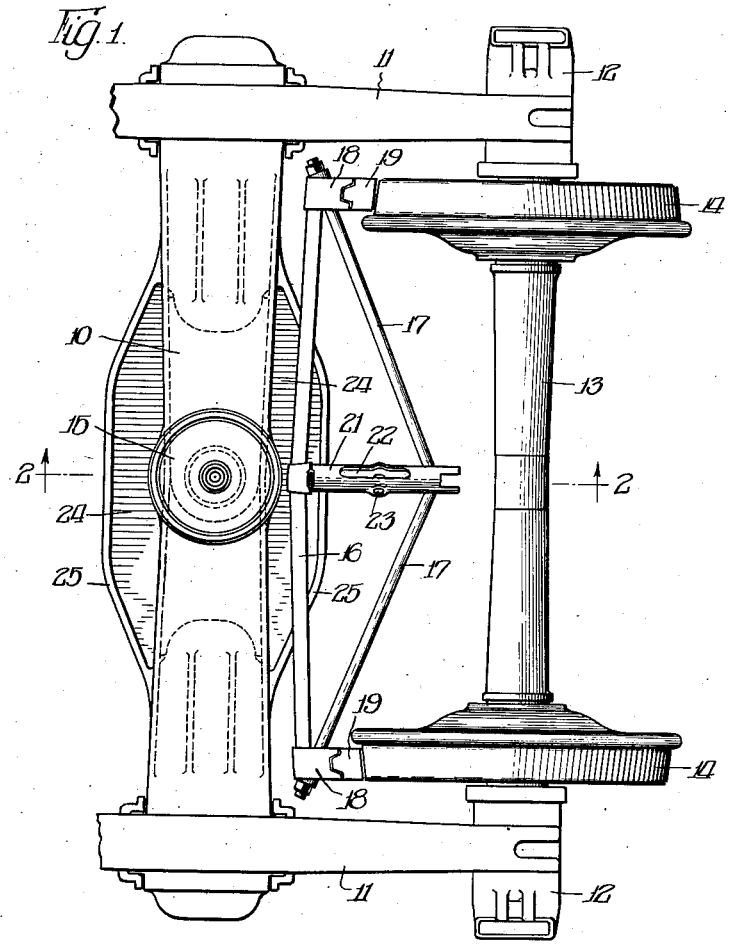
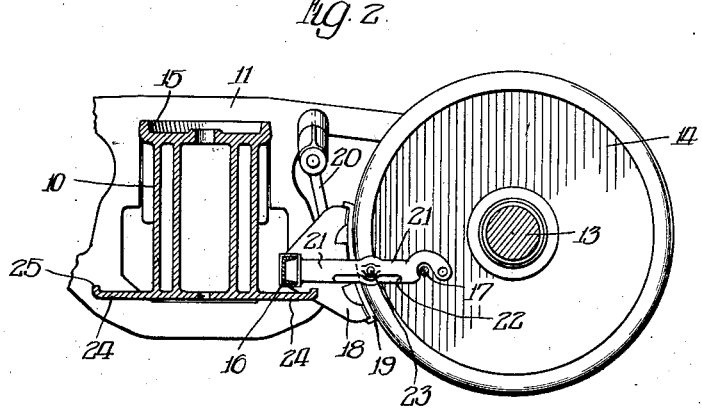
Inventor:
Paul J. McCullough,
By Wilkinson Huxley Byron & Knight
Attys.

Patented May 26, 1931

1,806,635

UNITED STATES PATENT OFFICE

PAUL J. McCULLOUGH, OF ST. LOUIS, MISSOURI, ASSIGNOR TO SCULLIN STEEL CO., OF ST. LOUIS, MISSOURI, A CORPORATION OF DELAWARE

BRAKE BEAM SAFETY DEVICE

Application filed May 2, 1929. Serial No. 359,742.

This invention relates to improvements in car trucks and principally to improvements in railway car trucks including a safety device for catching the brake beam should it break loose and prevent its coming into contact with the road bed.

It has been common practice to utilize brake beam safety devices comprising brackets which project beneath the brake beam in order to catch the brake beam should breakage occur and prevent its coming into contact with the road bed and causing serious damage, but the brake beam safety device has principally been attached to the spring plank or safety hangers have been utilized which surround the brake beam.

It is an object of the present invention to simplify the construction especially in a truck which does not use a spring plank by providing a bracket which extends from the bolster of the car truck. The safety bracket may be preferably formed integral with the bolster or it may be secured as a separate attachment by means of bolts or rivets.

It is further an object of the present invention to form the truck bolster with transversely extending webs forming brackets in such a manner that the safety brackets are initially a sufficient distance below the brake beam to permit the usual vertical movement of the bolster to take place without causing a contact between the safety brackets and the brake beams.

Further objects and advantages of the present improvements will be more readily apparent from the following description taken in connection with the disclosed embodiment shown in the accompanying drawings in which:

Figure 1 is a fragmentary plan view of a four-wheel car truck.

Figure 2 is a vertical section taken on the plane indicated by 2—2 in Figure 1.

The car truck disclosed is generally of common construction embodying a bolster 10 connected at its ends to integral side frames 11, the side frames 11 carrying journal boxes 12 which provide bearings for the axle 13. Wheels 14 are supported by the axle just inside the journal box bearings. The bolster 10 has a box section, as illustrated in Figure 2, and includes a center plate bearing 15 but it will be obvious that many other shapes of the bolster could be utilized without departing from the spirit of the present invention. A truss brake beam is shown including a compression member 16, and tension rods 17 connected at their ends to brake heads 18. The brake heads 18 carry the brake shoes 19 and may be supported by hangers 20. A center strut 21 extends between the compression and tension members and forms a brake lever fulcrum including a slot 22 and pin bearing 23.

It is generally desirable to provide some form of safety device which extends beneath the brake beam so that if the brake beam should break or become disengaged from its supporting connections, it will not be allowed to drop into contact with the road bed. I, therefore show brackets 24 which extend transversely from both sides of the center portion of the bottom of the truck bolster and extend, as shown in the drawing, beneath the compression member of the brake beam. The brackets 24 are preferably formed, as shown in the drawings, integral with the truck bolster and form webs which are extensions of the lower web of the bolster. The webs or brackets 24 may if so desired, be formed with upstanding ribbed edges 25 to strengthen the construction and to serve as retaining means to prevent the slippage of the beam, should it drop on a web.

It will be apparent that such a construction of the brake beam safety device is relatively easy to manufacture and does not require adjustment nor is it subject to wear. It is obvious that the brackets should be so designed that the usual vertical movement of the spring-supported bolster may be allowed without causing contact between the brackets 24 and the brake beam. However, should the brake beam become disengaged or broken, it will be caught by the brackets 24.

It is apparent that many modifications may be resorted to in the commercial embodiments of my invention according to the particular type of truck without departing from the spirit of my invention as expressed in the appended claims.

I claim:—

1. A car truck including a bolster and a supported brake beam, and a bracket outwardly extending from the truck bolster and rigid therewith beneath the brake beam and serving as a safety device.

2. A car truck including a bolster and supported brake beams, and brackets formed integral with the truck bolster extending outwardly therefrom beneath said brake beams and serving as safety devices.

3. A car truck including a bolster and supported brake beams, said bolster including a lower web and extensions therefrom, said extensions being arranged beneath said brake beams and acting as safety devices, said extensions also being vertically spaced downward from said brake beams whereby the usual vertical movement of the bolster is permitted.

4. A car truck of the type including a bolster and truss brake beams, said bolster having integrally formed therewith, brackets extending from the center portion of said bolster beneath said brake beams, said brackets being adapted to act as safety devices.

5. A car truck of the type including a bolster and truss brake beams, said bolster having an integral lower web and integral flanges in the plane of said lower web outwardly extending from the center portion of said bolster beneath portions of said brake beams to act as safety devices.

6. A truck bolster including rigid brackets outwardly extending therefrom adapted to project beneath supported brake beams and to serve as safety devices, the outer edges of said brackets including raised lips to prevent slipping of the brake beams when the brackets are acting as safety devices.

7. A truck bolster including rigid brackets outwardly extending from the center portion thereof adapted to serve as brake beam safety devices.

8. A truck bolster box type in section including a lower tension member and brackets outwardly extending from said tension member and adapted to serve as brake beam safety devices.

Signed at St. Louis, Missouri, this 27th day of April, 1929.

PAUL J. McCULLOUGH.